(12) United States Patent
Laming et al.

(10) Patent No.: US 6,813,079 B2
(45) Date of Patent: Nov. 2, 2004

(54) FABRICATING OPTICAL WAVEGUIDE GRATINGS

(75) Inventors: Richard Ian Laming, Edinburgh (GB); Martin Cole, Delray Beach, FL (US)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 10/109,639

(22) Filed: Apr. 1, 2002

(65) Prior Publication Data

US 2002/0105727 A1 Aug. 8, 2002

Related U.S. Application Data

(63) Continuation of application No. 09/242,720, filed as application No. PCT/GB97/02099 on Aug. 4, 1997, now Pat. No. 6,384,977.

(30) Foreign Application Priority Data

Aug. 23, 1996 (GB) .............................................. 9617688

(51) Int. Cl.⁷ ............................. G02B 27/42; G02B 6/00
(52) U.S. Cl. ....................... 359/570; 359/566; 359/900; 385/37
(58) Field of Search ............................ 359/3, 8, 15, 34, 359/35, 566, 569, 570–572, 575, 577, 900; 385/37

(56) References Cited

U.S. PATENT DOCUMENTS

| | | | |
|---|---|---|---|
| 3,650,605 A | 3/1972 | Little, Jr. ..................... | 359/577 |
| 4,093,338 A | 6/1978 | Bjorklund et al. ............ | 359/35 |
| 4,474,427 A | * 10/1984 | Hill et al. | |
| 5,066,133 A | 11/1991 | Brienza ....................... | 359/570 |
| 5,363,239 A | 11/1994 | Mizrahi et al. .............. | 359/569 |
| 5,367,588 A | 11/1994 | Hill et al. ...................... | 385/37 |
| 5,604,829 A | 2/1997 | Bruesselbach ................ | 385/37 |
| 5,655,040 A | 8/1997 | Chesnoy et al. .............. | 385/37 |
| 5,748,814 A | 5/1998 | Painchaud et al. ............ | 385/37 |

FOREIGN PATENT DOCUMENTS

| | | |
|---|---|---|
| EP | 0 631 158 A1 | 12/1994 |
| GB | 2 212 935 A | 8/1989 |
| WO | WO 95/22068 | 8/1995 |
| WO | WO 96/24079 | 8/1996 |
| WO | WO 96/36895 | 11/1996 |

OTHER PUBLICATIONS

A. Othonos, et al., "Novel and Improved Methods of Writing Bragg Gratins with Phase Masks", IEEE Photonics Techn. Lett. vol. 7, No. 10, pp. 1183–1185, Oct. 1995.*

Andreas Othonos and Kyriacos Kalli, Fiber Bragg Gratings, Chapter 4, pp. 149–187. Artech House Inc. publishing, Boston, MA, © 1999.*

H.N. Rourke, et al., "Fabrication and characterisation of long, narrowband fibre gratings by phase mask scanning", Electronics Letters, vol. 30, No. 16, pp. 1341–1342, Aug. 4, 1994.*

(List continued on next page.)

Primary Examiner—John Juba, Jr.
(74) Attorney, Agent, or Firm—Finnegan, Henderson, Farabow, Garrett & Dunner, L.L.P.

(57) ABSTRACT

A method of fabricating an optical waveguide grating having a plurality of grating lines of refractive index variation comprises the steps of: (i) repeatedly exposing a spatially periodic writing pattern onto a photosensitive optical waveguide: and (ii) moving the writing light pattern and/or the waveguide between successive exposures of the writing light pattern, so that each of at least a majority of the grating lines is generated by at least two exposures to different respective regions of the writing light pattern.

29 Claims, 3 Drawing Sheets

OTHER PUBLICATIONS

W.H. Loh, et al., "Complex grating structures with uniform phase masks based on the moving fiber–scanning beam technique", Optics Letters, vol. 20, No. 20, pp. 2051–2053, Oct. 15, 1995.*

R. Kashyap, et al., "UV written reflection grating structures in photosensitive optical fibres using phase–shifted phase masks", Electronics Letters, vol. 30, No. 23, pp. 1977–1978, Nov. 10, 1994.*

D.Z. Anderson, et al., "Production of In–Fibre Gratings Using a Diffractive Optical Element", Electronics Letters, vol. 29, No. 6, pp. 566–568, Mar. 18, 1993.*

Stubbe et al., "Novel Technique for Writing Long Superstructured Fiber Bragg Gratings," Waveguides—Postdeadline Paper 1, 22:285–287, (1995).

Martin et al., "Novel Writing Technique of Long and Highly Reflective In–Fibre Gratings," Electronics Letters, May 12, 1994, vol. 30, No. 10, pp. 811–812.

Cole et al., "Moving Fibre/Phase Mask–Scanning Beam Technique for Enhanced Flexibility in Producing Fibre Gratings with Uniform Phase Mask," Electronics Letters, Aug. 17, 1995, vol. 31, No. 17, pp. 1488–1490.

Garthe et al., "Practical Dispersion Equaliser Based on Fibre Gratings with a Bitrate Length Product of 1.6 TB/S–KM," Proceedings of the 1994 $20^{th}$ European Conference on Optical Communication—ECOC '94, pp. 11–14, (1994).

Meltz et al., "Formation of Bragg Gratings in Optical Fibers by a Transverse Holographic Method," Optics Letters, vol. 14, No. 15, pp. 823–825, Aug. 1989.

Laming et al., "A Dispersion Tunable Grating in a 10Gbit/s 100–220km Step Index Fibre Link," Proc. ECOC '95, Brussels, vol. 2, papers We.B.1.7, pp. 585–588, Sep. 1995.

Kashyap et al., "Super–Step–Chirped Fibre Bragg Gratings," Electronics Letters, Jul. 18, 1996, vol. 32, No. 15, pp. 1394–1396.

K. Hill et al., Bragg Gratings Fabricated in Monomode Photosensitive Optical Fiber by UV Exposure Through Phase Mask,: Appl. Phys. Lett., vol. 62, No. 10, pp. 1035–1037, Mar. 1993.

* cited by examiner

FABRICATING OPTICAL WAVEGUIDE GRATINGS

This is a continuation of U.S. patent application Ser. No. 09/242,720, filed Jan. 13, 2000, now U.S. Pat No. 6,384,977, which claims benefit of and is a 371 of PCT/GB97/02099 filed Aug. 4, 1997, both of which are incorporated herein by reference.

BACKGROUND OF THE INVENTION

This invention relates to fabricating optical waveguide gratings.

Dispersion compensation is an attractive technique allowing the upgrade of the existing installed standard fibre network to operation at 1.5 µm where it exhibits a dispersion of ~(about) 17 ps/nm.km which would otherwise prohibit high capacity (eg. 10 Gbit/s) data transmission.

Chirped fibre gratings are currently the most attractive technique for fibre dispersion compensation [1]. This is because they are generally low loss, compact, polarisation insensitive devices which do not tend to suffer from optical non-linearity which is the case with the main competing technology, dispersion compensating fibre.

For present practical applications chirped gratings must exhibit both high dispersion, ~1700 ps/nm, sufficient to compensate the dispersion of around 100 km of standard fibre at a wavelength of 1.55 µm, and a bandwidth of around 5 nm. This implies a need for a chirped grating of length 1 m.

Fibre gratings are generally created by exposing the core of an optical fibre to a periodic UV intensity pattern [2]. This is typically established using either an interferometer or a phase mask [3]. To date, phase masks are the preferred approach owing to the stability of the interference pattern that they produce. The length of the grating can be increased by placing the fibre behind the phase mask and scanning the UV beam along it. Techniques for post chirping a linear grating after fabrication include applying either a strain [1] or temperature gradient [4] to it. However these techniques are limited due to the length of the initial grating (~10 cm with available phase masks) and the length over which a linear temperature or strain gradient can be applied. Alternatively more complex step chirped phase masks can be employed [5]. However, all of these techniques are currently limited to a grating length of about 10 cm.

SUMMARY OF THE INVENTION

In addition to chirping the grating, it is also sometimes desirable to be able to apodise (window) the gratings to reduce multiple reflections within them and to improve the linearity of the time delay characteristics. A powerful technique has been developed which allows chirped and apodised gratings to be written directly in a fibre, referred to as "the moving fibre/phase mask scanning beam technique" [6]. This technique is based on inducing phase shifts between the phase mask and the fibre as the phase mask and fibre are scanned with the UV beam. Apodisation is achieved by dithering the relative phase between the two at the edges of the grating. Like all the previous techniques the one draw back with this technique is that it is again limited to gratings the length of available phase masks, ~10 cm at present.

This problem has been overcome in one approach by Kashyap et al using several 10 cm step-chirped phase masks [5]. These are scanned in series to obtain a longer grating. The phase "glitch" or discontinuity between the sections is subsequently UV "trimmed" to minimise its impact. However this is a time consuming and costly process. In addition the effect of the UV trimming will vary with grating ageing.

A technique for potentially writing longer gratings has been reported by Stubbe et al [7]. In this case a fibre is mounted on an air-bearing stage and continuously moved behind a stationary grating writing interferometer. The position of the fibre is continuously monitored with a linear interferometer. The UV laser is pulsed to write groups of grating lines with period defined by the writing interferometer. A long grating can be written by writing several groups of grating lines in a linearly adjacent series, with controlled phase between the sections. The phase shift between each group of grating lines is controlled via the linear interferometer and a computer which sets the time the laser pulses. A short pulse, ~10 ns, is required such that the position of the writing lines is effectively stationary and accurately controlled with respect to fibre motion. Having said this, however, jitter in the pulse timing and in the linear interferometer position will give detrimental random phase errors in the grating. Chirped gratings can potentially be fabricated by continuously introducing phase shifts between adjacent groups along the grating. Obviously the maximum translation speed is limited by the number of grating lines written with one laser pulse and the maximum repetition rate of the pulsed laser. It is also proposed in this paper that apodisation is achieved by multiple writing scans of the grating.

This invention provides a method of fabricating an optical waveguide grating having a plurality of grating lines of refractive index variation, the method comprising the steps of:

(i) repeatedly exposing a spatially periodic writing light pattern onto a photosensitive optical waveguide; and (ii) moving the writing light pattern and/or the waveguide between successive exposures or groups of exposures of the writing light pattern, characterised in that the successive exposures or groups of exposures overlap so that each of at least a majority of the grating lines is generated by at least two exposures to different respective regions of the writing light pattern.

Embodiments of the invention provide a number of advantages over previous techniques:

1. The realisation that the laser does not have to be pulsed but just has to be on for a particular duty cycle—preferably less than 50% of the period. This allows an externally modulated CW (continuous wave) laser to be used.

2. With this technique the grating lines are re-written by several successive exposures of the writing light beam at every grating period (or integral number of grating periods). Thus the footprint defined by the writing light beam is significantly overlapped with the previous lines. Significant averaging of the writing process is achieved thus improving the effective accuracy and resolution of the system, compared to that of [7] where a group of lines is written in a single exposure, and the fibre is then advanced to a fresh portion where a further group of lines is written in a single exposure.

3. Effectively controlling the grating writing process on a line-by-line basis allows accurate apodisation to be achieved. This may be performed in embodiments of the invention by dithering the grating writing interferometer position in the fibre to wash out or attenuate the grating strength whilst keeping the average index change constant.

4. The technique offers the further advantage that the CW laser may be extremely stable, whereas pulsed lasers (e.g.

those used in [7]) may suffer from pulse-to-pulse instability which is not averaged. In addition the high peak powers of the pulsed laser may cause non-linear grating writing effects.

5. Arbitrary phase profiles and in particular a linear chirp can be built up by inducing phase shifts electronically along the grating as it grows. In a similar manner to the "Moving fibre/phase mask" technique [6] the maximum wavelength is inversely proportional to the beam diameter. This can be further improved in particular embodiments of the invention by incorporating a short, linearly chirped phase mask. Thus as the fibre is scanned the UV beam may be also slowly scanned across the phase mask, an additional small phase shift is induced, whilst most significantly we have access to writing lines of a different period allowing larger chirps to be built up.

This invention also provides an optical waveguide grating fabricated by a method according to the above methods.

This invention also provides apparatus for fabricating an optical fibre grating having a plurality of grating lines of refractive index variation, the apparatus comprising:

a writing light beam source for repeatedly exposing a spatially periodic writing light pattern onto a photosensitive optical waveguide; and means for moving the writing light pattern and/or the waveguide between successive exposures or a groups of exposures of the writing light pattern, characterised in that the successive exposures or groups of exposures overlap so that each of at least a majority of the grating lines is generated by at least two exposures to different respective regions of the writing light pattern.

The various sub-features defined here are equally applicable to each aspect of the present invention.

BRIEF DESCRIPTION OF THE FIGURES

The invention will now be described by way of example with reference to the accompanying drawings, throughout which like parts are referred to by like references, and in which.

DETAILED DESCRIPTION OF THE INVENTION

Figure 1:
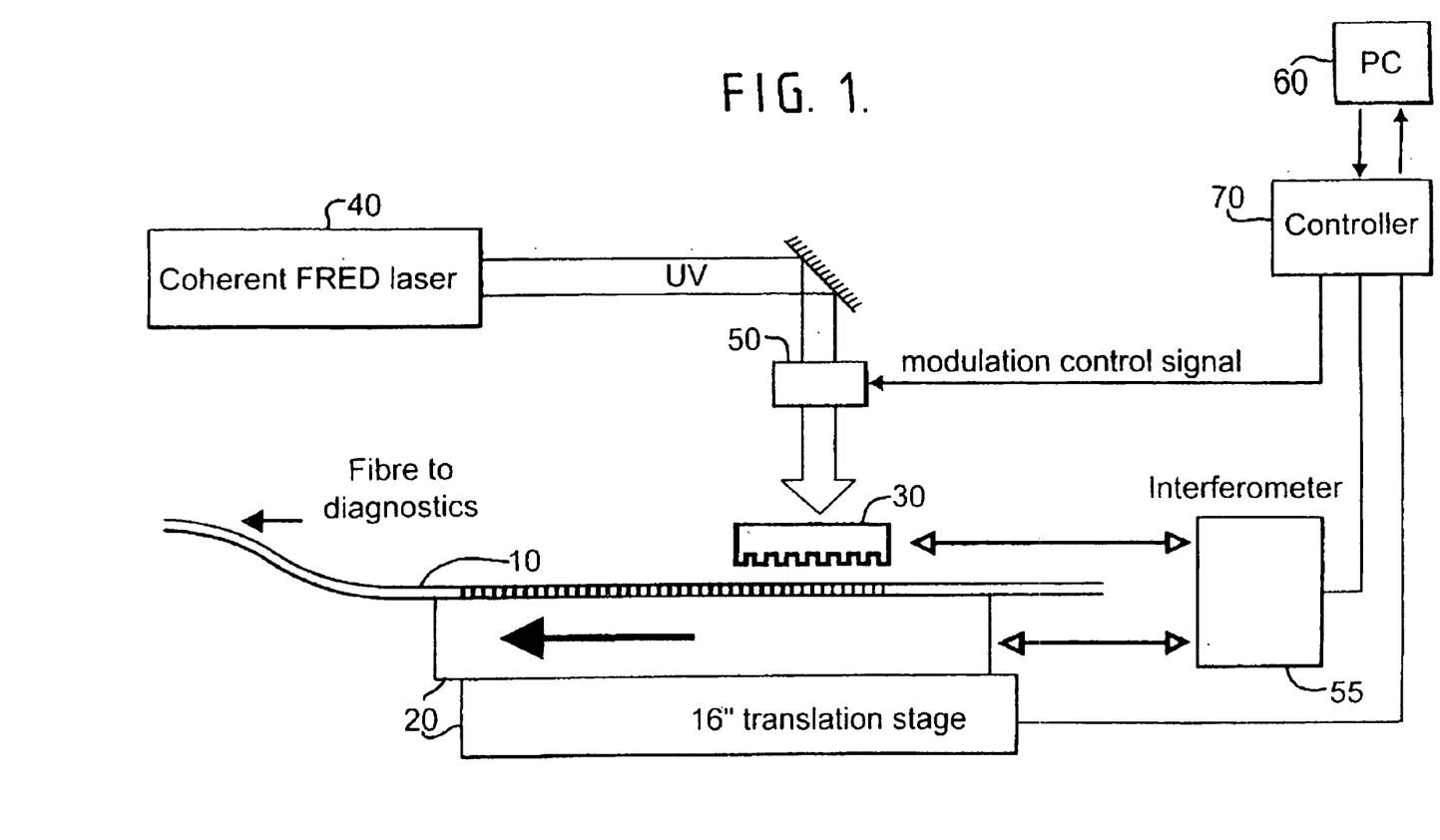
FIG. 1 is a schematic diagram of a fibre grating fabrication apparatus.

FIG. 1 is a schematic diagram of a fibre grating fabrication apparatus. An optical fibre (e.g. a single mode photorefractive fibre) 10 is mounted on a crossed roller bearing translation stage 20 (such as a Newport PMLW160001) which allows for a continuous scan over 40 cm. The fibre 10 is positioned behind a short (~5 mm) phase mask 30 (e.g a mask available from either QPS or Lasiris).

The fibre is continuously and steadily linearly translated or scanned in a substantially longitudinal fibre direction during the grating exposure process.

Ultraviolet (UV) light at a wavelength of 244 nm from a Coherent FRED laser 40 is directed to the fibre/phase mask via an acoustic-optic modulator 50 (e.g. a Gooch & Housego, M110-4(BR)) operating on the first order.

The relative position of the fibre to the interference pattern of the phase mask is continuously monitored with a Zygo, ZMI1000 differential interferometer 55. The interferometer continuously outputs a 32-bit number (a position value) which gives the relative position with a ~1.24 nm resolution. This output position value is compared by a controller 70 with switching position data output from a fast computer 60 (e.g. an HP Vectra series 4 5/166 with National Instruments AT-DIO-32F) in order that the controller can determine whether the UV beam should be on or off at that position. Whether the UV beam is in fact on or off at any time is dependent on the state of a modulation control signal generated by the controller 70 and used to control the acousto-optic modulator 50.

So, as each position value is output by the interferometer, the controller 70 compares that position value with the switching position data currently output by the computer 60. If, for illustration, the interferometer is arranged so that the position values numerically increase as the fibre scan proceeds, then the controller 70 detects when the position value becomes greater than or equal to the current switching position data received from the computer 60. When that condition is satisfied, the controller 70 toggles the state of the modulation control signal, i.e. from "off" to "on" or vice-versa. At the same time, the controller 70 sends a signal back to the computer 60 requesting the next switching position data corresponding to the next switching position.

If the fibre was scanned with the UV beam continuously directed onto the fibre, no grating would be written since the grating lines would be washed out by the movement.

However if the UV beam is strobed or modulated (under control of the switching position data generated by the computer 60) with a time period matching or close to:

phase mask projected fringe pitch/fibre translation speed then a long grating would grow.

This expression is based on a time period of a temporally regular modulation of the UV beam, and so assumes that the fibre is translated at a constant velocity by the translation stage. However, more generally, the switching on and off of the UV beam is in fact related to the longitudinal position of the fibre, so that in order to generate a grating the UV beam should be turned on and off as the fibre is translated to align the interference pattern arising from successive exposures through the phase mask.

Figure 2A:
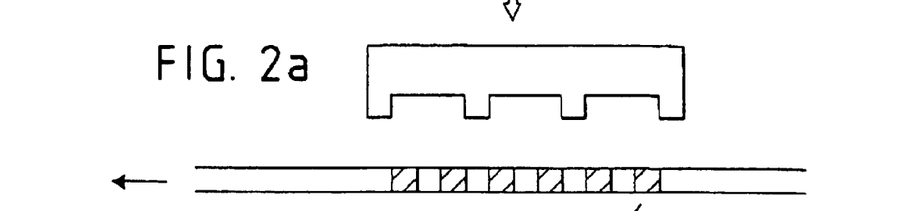
FIGS. 2a to 2c are schematic diagrams showing a grating fabrication process by repeated exposures.
Figures 2B, 2C:
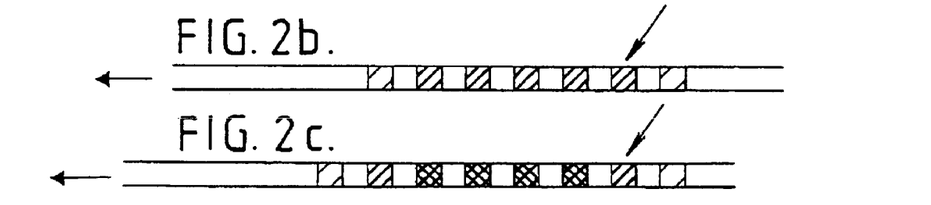

FIGS. 2a to 2c are schematic diagrams showing a grating fabrication process by repeated exposures of the fibre to the UV beam.

In FIG. 2a, the UV beam from the acousto-optic modulator 50 passes through the phase mask 30 to impinge on the fibre 10. During the exposure process, the fibre 10 is being longitudinally translated by the translation stage 20 in a direction from right to left on the drawing. FIG. 2a illustrates (very schematically) a refractive index change induced in the fibre by a first exposure through the phase mask.

FIGS. 2a to 2c illustrate a feature of the normal operation of a phase mask of this type, namely that the pitch of the lines or fringes of the interference pattern projected onto the fibre (which gives rise to the lines of the grating) is half that of (i.e. twice as close as that of) the lines physically present (e.g. etched) in the phase mask. In this example, the phase mask has a "physical" pitch of 1 $\mu$m, and the lines projected onto the fibre have a pitch of 0.5 $\mu$m.

The UV beam is modulated by the acousto-optic modulator in a periodic fashion synchronised with the translation of the fibre. In this way, successive exposures, such as the two subsequent exposures shown in FIGS. 2b and 2c, generate periodic refractive index changes aligned with and overlapping the first exposure of FIG. 2a. Thus, the refractive index change providing each individual grating "element" or fringe is actually generated or built up by the cumulative effects of multiple exposures through different parts of the phase mask as the fibre moves along behind the phase mask. This means (a) that the optical power needed to generate the grating can be distributed between potentially a large number of exposures, so each exposure can be of a relatively low power (which in turn means that the output power of the laser 40 can be relatively low); and (b) the grating can be apodised by varying the relative positions of successive exposures (this will be described below with reference to FIG. 3b).

Although each of the successive exposures of the fibre to UV light through the phase mask 30 could be a very short pulse (to "freeze" the motion of the fibre as the exposure is made), this has not proved necessary and in fact the present embodiment uses an exposure duty cycle in a range from below 10% to about 50%, although a wider range of duty cycles is possible. An example of a simple regular exposure duty cycle is shown schematically in FIG. 3a, which in fact illustrates the state of the modulation control signal switching between an "on" state (in which light is passed by the acousto-optic modulator) and an "off" state (in which light is substantially blocked by the acousto-optic modulator). The period, τ, of the modulation corresponds to the time taken for the fibre 10 to be translated by one (or an integral number) spatial period of the interference pattern generated by the phase mask 30.

Figure 3A:
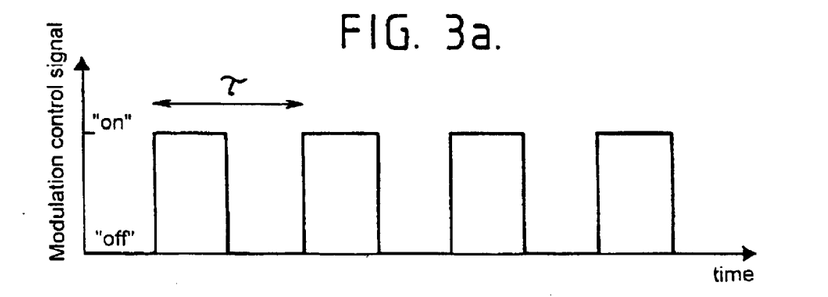
FIGS. 3a and 3b are schematic timing diagrams showing the modulation of a UV beam.

As the duty cycle for the UV exposure increases, the grating contrast decreases (because of motion of the fibre during the exposure) but the writing efficiency increases (because more optical energy is delivered to the fibre per exposure). Thus, selection of the duty cycle to be used is a balance between these two requirements.

Assuming linear growth, the index modulation, $n_g(z)$ in an ideal grating can be described as a raised cosine profile:

$$n_g(z) \propto 1 + \sin(2\pi z/\Lambda)$$

where z is the position down the fibre and $\Lambda$ the grating period. With the new technique we obtain:

$$n_g(z) \propto (\Delta\Lambda_{ON}/\Lambda)[1+\{\sin(\pi\Delta\Lambda_{ON}/\Lambda)/(\pi\Delta\Lambda_{ON}/\Lambda)\}\sin(2\pi(z+\Delta\Lambda_{ON}/2)/\Lambda)]$$

where $\Delta\Lambda_{ON}/\Lambda$ is the fraction of the period that the beam is on (i.e. the duty cycle).

For small values of $\Delta\Lambda_{ON}/\Lambda$ a near 100% grating contrast is obtained however the efficiency of the grating writing is reduced to $\sim\Delta\Lambda_{ON}/\Lambda$ because most of the UV beam is prevented from reaching the fibre.

The maximum grating strength is obtained for $\Delta\Lambda_{ON}/\Lambda=0.5$ however the ratio of dc to ac index change is worse. For $\Delta\Lambda_{ON}/\Lambda>0.5$ the grating begins to be reduced whilst the dc index change continues to build.

Experimentally, a good value for $\Delta\Lambda_{ON}/\Lambda$ has been found to be ~0.3–0.4.

Thus, with embodiments of this technique, exposure of the grating lines or elements is repeated every grating period. Thus the footprint defined by the UV beam, which might for example for a 500 μm diameter beam, $\phi_{beam}$, consists of $\phi_{beam}/\Lambda(\sim1000)$ lines, is significantly overlapped with the previously exposed lines. Significant averaging of the writing process given by $(\phi_{beam}/\Lambda)^{1/2}$ is therefore achieved, thus improving the effective accuracy and resolution of the system.

The computer in this embodiment actually generates the switching positions internally as "real" numbers (obviously subject to the limitation of the number of bits used), but then converts them for output to the controller into the same unit system as that output by the Zygo interferometer, namely multiples of a "Zygo unit" of 1.24 nm. This internal conversion by the computer makes the comparison of the actual position and the required switching position much easier and therefore quicker for the controller. A random digitisation routine is employed in the computer 60 to avoid digitisation errors during the conversion from real numbers to Zygo units. This involves adding a random amount in the range of ±0.5 Zygo units to the real number position data before that number is quantised into Zygo units. Thus an effective resolution can be obtained of:

$$1.24 \text{ nm}/(\phi_{beam}/\Lambda)^{1/2} \approx 0.03 \text{ nm}.$$

The technique offers the further advantage that the CW laser is extremely stable whereas pulsed lasers (as required in the technique proposed by Stubbe et al [7]) may suffer from pulse-to-pulse instability which, in the Stubbe et al technique, is not averaged over multiple exposures. In addition the high peak powers of a pulsed laser may cause non-linear grating writing effects, which are avoided or alleviated by using longer and repeated exposures in the present technique.

Figure 3B:
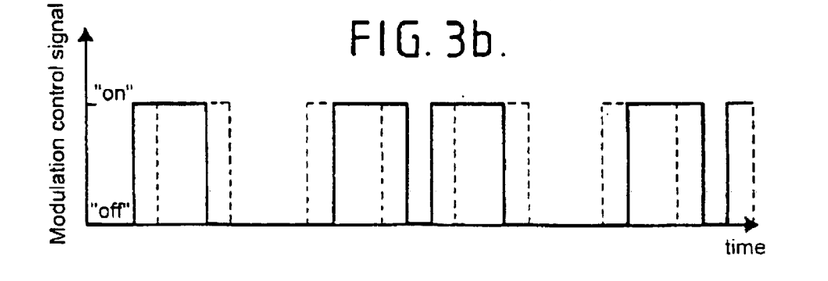

A refinement of the above technique, for producing apodised gratings, will now be described with reference to FIG. 3b.

Using the techniques described above, effectively controlling the grating writing process on a line-by-line basis allows accurate apodisation to be achieved.

Apodisation is achieved by effectively dithering the grating writing interferometer position in the fibre to wash out or attenuate the grating strength. However, if the overall duty cycle of the exposure is kept the same, and just the timing of each exposure dithered, the average index change along the grating is kept constant.

To completely wash out the grating subsequent on periods of the UV laser are shifted in phase (position) by $\pm\pi/2(\pm\Lambda/4)$. To achieve a reduced attenuation the amplitude or amount of dither is reduced. FIG. 3b illustrates an applied dither of about $\pm\pi/3$ from the original (undithered) exposure times.

This technique of apodising is better with an exposure duty cycle of less than 50%, to allow a timing margin for 100% apodisation.

One example of the use of this technique is to generate a grating with a contrast increasing at one end of the grating according to a raised cosine envelope, and decreasing at the other end of the grating in accordance with a similar raised cosine envelope, and remaining substantially constant along the central section of the grating. This apodisation can be achieved particularly easily with the present technique, as the central section requires no phase shift between successive exposures, and the two raised cosine envelopes require a phase shift that varies linearly with longitudinal position of the fibre.

The required phase shifts can be calculated straightforwardly by the computer 60, under the control of a simple computer program relating required phase shift to linear position of the fibre (effectively communicated back to the computer 60 by the controller 70, whenever the controller 70 requests a next switching position data value).

Other apodisation schemes are also possible. Compared with previous methods of dithering [6] this technique is not limited by the dynamics of a mechanical stage used for dithering, but instead simply adjusts the switching time of a non-mechanical modulator element 50. It can also achieve substantially instantaneous phase shifts.

Furthermore, arbitrary phase profiles and in particular a linear chirp can be built up by the computer 60 inducing phase shifts along the grating as it is fabricated. In a similar mariner to the "Moving fibre/phase mask" technique [6] the maximum wavelength is inversely proportional to the beam diameter. However, with the present technique an improvement can be obtained (with respect to the technique of [6]) by incorporating a short, linearly chirped phase mask. Thus as the fibre is scanned the UV beam is also slowly scanned (by another PZT translation stage, not shown) across the phase mask. This scanning of the position of the UV beam in itself induces a small chirp, in accordance with the techniques described in reference [6], but more significantly the translated beam accesses writing lines of a different period allowing larger chirps to be built up. This has been tested using a 19 mm diameter, ~20 nm chirped phase mask (sourced from Lasiris) with its central period around 1070 nm. This allows ~30 nm chirped gratings centred around a central wavelength of 1550 nm to be fabricated.

Figure 4A:
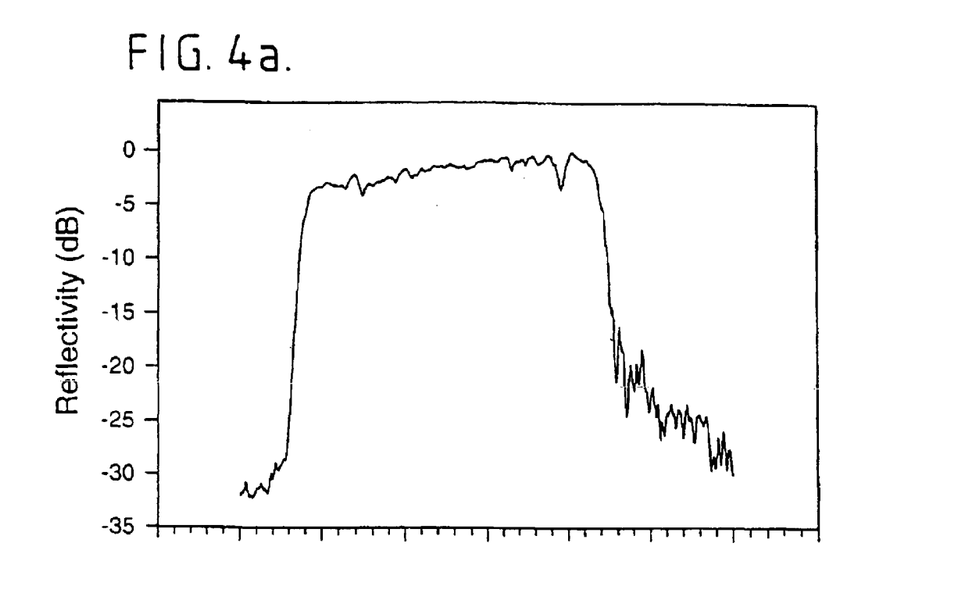
FIGS. 4a and 4b are schematic graphs characterising a 20 cm grating produced by the apparatus of FIG. 1.
Figure 4B:
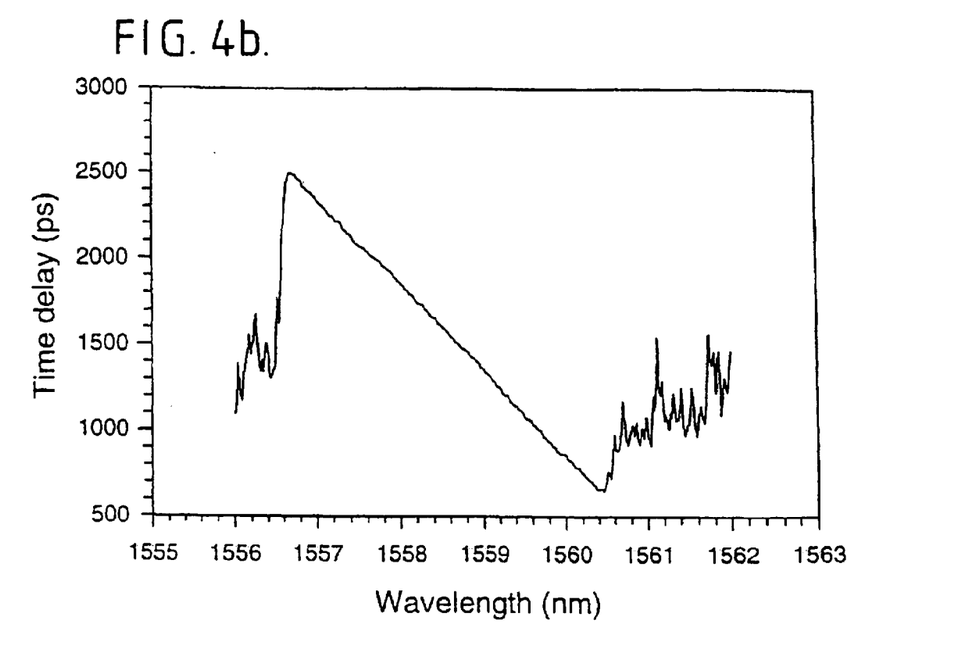

FIGS. 4a and 4b are schematic graphs showing the characterisation of a 20 cm linearly chirped grating written at a fibre translation speed of 200 μm/s with the basic technique described earlier, i.e. with a fixed mask. At this fibre translation speed, for a projected fringe pitch of 0.5 μm the writing light beam is switched at a switching rate of 400 Hz. In other words, the fibre advances by one projected fringe between exposures. (It is noted that the limitation on fibre translation speed in these prototype experiments is the calculation speed of the computer 60 used in the experiments, and that given a faster computer such as a Pentium or subsequent generation PC, much higher translation speeds of, say, 10 mm per second or more would be possible).

In particular, therefore, FIG. 4a is a graph of reflectivity against wavelength, and FIG. 4b is a graph of time delay against wavelength. The wavelength (horizontal) axes of the two graphs have the same scale, which for clarity of the diagram is recited under FIG. 4b only.

A ~4 nm bandwidth and dispersion of ~500 ps/nm are observed.

Such results have not been reported by any other method. Gratings up to 40 cm and writing speeds up to 1 mm/s have been demonstrated. Lengths in excess of 1 m and writing speeds up to 10 mm/s are feasible.

In the above description, the fibre has been translated with respect to the phase mask, and in the later description the UV beam is translated with respect to the phase mask. However, it will be clear that the important thing is relative motion, and so the choice of which component (if any) remains "fixed" and which is translated is relatively arbitrary. Having said this, however, the arrangement described above has been tested experimentally and has been found to be advantageously convenient to implement. It will also be apparent that in other embodiments each "exposure" could in fact involve a group of two or more exposures, with the position of the fibre with respect to the writing light beam being constant or substantially constant for exposures within a group, but different from group to group.

PUBLICATION REFERENCES

1. D. Garthe et al, Proc. ECOC, vol. 4, (post-deadline papers), pp. 11–14 (1994).
2. G. Meltz et al, Opt. Lett., 14(15), pp. 823–825, 1989.
3. K. O. Hill et al, Appl. Phys. Lett., 62(10), pp. 1035–1037, 1993.
4. R. I. Laming et al, Proc.ECOC'95, Brussels, Vol 2, Paper We.B.1.7, pp 585–8, 17–21 September 1995.
5. R. Kashyap et al, Electronics Letters, Vol 32 (15), pp. 1394–6, 1996.
6. M. J. Cole et at, Electronics Letters, Vol 31 (17), pp 1488–9, 1995.
7. R. Stubbe et al, postdeadline paper 1, Proc. Photosensitivity and Quadratic Nonlinearity in Glass Waveguides, Portland, Oreg. Sep. 9–11, 1995.

What is claimed is:

1. A method of fabricating a grating in a photosensitive optical waveguide, the method comprising the steps of:
   (i) repeatedly exposing the waveguide to a spatially periodic light pattern generated from a light beam directed through a phase mask, to create a plurality of grating lines of refractive index variation within the waveguide; and
   (ii) between successive exposures or groups of exposures, changing the relative position of the phase mask and the waveguide in a direction substantially along the length of the waveguide by a distance less than the extent of the light pattern in that direction so that at least a majority of the grating lines are created by successive exposures to different pads of the light pattern.

2. A method according to claim 1, in which the relative position of the phase mask and the waveguide are changed between exposures by a distance substantially corresponding to an integral number of spatial periods of the light pattern.

3. A method according to claim 2, in which the relative position of the phase mask and the waveguide are changed between exposures by a distance substantially corresponding to one spatial period of the light pattern.

4. A method according to claim 1, in which the light beam is generated by a source of continuous wave (cw) radiation.

5. A method according to claim 1, in which the repeated exposures are provided by modulating the intensity of the light beam.

6. A method according to claim 1, in which the change in relative position of the phase mask and the waveguide is achieved by moving at least one of the phase mask and the waveguide continuously throughout the repeated exposures.

7. A method according to claim 1, in which the light beam is intensity modulated to provide repeated exposures at a substantially constant repetition rate and duty cycle, and at least one of the phase mask and waveguide is moved continuously throughout the repeated exposures at a substantially constant velocity, thereby to give a grating with grating lines of substantially constant contrast.

8. A method according to claim 7, in which, during fabrication of end portions of the grating, the light beam is intensity modulated at a variable repetition rate and substantially constant duty cycle, thereby to give an apodised grating.

9. A method according to claim 1, in which the light beam is intensity modulated to provide repeated exposures at a varying repetition rate and/or duty cycle, and at least one of the phase mask and waveguide is moved continuously throughout the repeated exposures at a substantially constant velocity, thereby to give a grating with grating lines of varying contrast.

10. A method according to claim 1, in which the light beam is intensity modulated to provide repeated exposures, and at least one of the phase mask and waveguide is moved continuously throughout the repeated exposures at a varying velocity, thereby to give a grating with grating lines of varying contrast.

11. A method according to claim 1, in which the relative position of the phase mask and the waveguide is detected and compared with preset position data, the exposures being made in response to results of the comparison.

12. An optical waveguide grating fabricated according to the method of claim 1.

13. Apparatus for fabricating a grating in a photosensitive optical waveguide comprising:
   a light source arranged to direct a light beam through a phase mask to generate repeated exposures of a spatially periodic light pattern onto the waveguide, to create a plurality of grating lines of refractive index variation within the waveguide; and
   a translating device operable to change, between successive exposures or groups of exposures, the relative position of the phase mask and the waveguide in a direction substantially along the length of the waveguide by a distance less that the extent of the light pattern in that direction so that at least a majority of the grating lines are created by successive exposures to different parts of the light pattern.

14. Apparatus according to claim 13, and further comprising:
   a detector operable to detect the relative position of the phase mask and the waveguide; and
   a controller operable to receive the detected relative position, compare it with preset position data, and control the exposures of the light pattern in response to the comparison.

15. A method of fabricating a chirped grating in a photosensitive optical waveguide, the method comprising the steps of:
   (i) repeatedly exposing the waveguide to a spatially periodic light pattern generated from a light beam directed through a chirped phase mask, so as to create a plurality of grating lines of refractive index variation within the waveguide;
   (ii) between successive exposures or groups of exposures, changing the relative position of the light beam and the chirped phase mask so as to direct the light beam through respective different portions of the chirped phase mask; and
   (iii) between successive exposures or groups of exposures, changing the relative position of the chirped phase mask and the waveguide in a direction substantially along the length of the waveguide by a distance less than the length of the light pattern so that at least a majority of the grating lines are created by successive exposures to different parts of the light pattern.

16. A method according to claim 15 in which step (ii) is achieved by scanning the light beam across at least a portion of the chirped phase mask during the course of the fabrication.

17. A chirped optical waveguide grating fabricated according to the method of claim 15.

18. Apparatus for fabricating a chirped grating in a photosensitive optical waveguide comprising:
   a light source arranged to direct a light beam through a chirped phase mask to generate repeated exposures of a spatially periodic light pattern onto the waveguide, to create a plurality of grating lines of refractive index variation within the waveguide;
   a first translating device operable to change, between successive exposures or groups of exposures, the relative position of the light beam and the chirped phase mask so as to direct the light beam through respective different portions of the phase mask; and
   a translating device operable to change, between successive exposures or groups of exposures, the relative position of the phase mask and the waveguide in a direction substantially along the length of the waveguide by a distance less than the extent of the light pattern in that direction so that at least a majority of the grating lines are created by successive exposures to different parts of the light pattern.

19. A method of fabricating a grating in a photosensitive optical waveguide, the method comprising the steps of:
   (i) directing a light beam through a phase mask onto the waveguide to expose the waveguide to a light pattern which creates a plurality of grating lines of refractive index variation within the waveguide;
   (ii) changing the relative position of the phase mask and the waveguide in a direction substantially along the length of the waveguide by a distance less than the extent of the light pattern in that direction;
   (iii) repeating steps (i) and (ii) so that at least a majority of the grating lines are enhanced by further exposure to a different part of the light pattern;
   (iv) repeating step (iii) until a grating of desired length is obtained.

20. An optical waveguide grating having a plurality of grating lines of refractive index variation of a given period wherein the average precision of the positioning of the grating lines is no more than 0.25% of the period of the grating lines.

21. An optical waveguide grating according to claim 20, wherein the grating has a length which exceeds the length of a phase mask used to fabricate the grating.

22. An optical waveguide grating according to claim 21, wherein the grating has a length up to approximately 40 cm.

23. An optical waveguide grating according to claim 21, wherein the grating has a length in the range of approximately 40 cm to approximately 100 cm.

24. An optical waveguide grating according to claim 21, wherein the grating has a length in excess of 1 meter.

25. A chirped optical waveguide grating having a plurality of grating lines of refractive index variation with a variable period wherein an averaged precision of the positioning of the grating lines is no more than 0.25% of the period of the grating lines at any given point.

26. An optical waveguide grating having a plurality of periodic grating lines of refractive index variation wherein an average error in the actual position of the grating lines compared with the intended position of the grating lines during fabrication does not exceed 0.25% of the period of the grating lines.

27. An optical waveguide grating having a plurality of grating lines of refractive index modulation with a period $\Lambda$, wherein the refractive index modulation, $n_g(z)$ is described by $$n_g(z) \propto (\Delta\Lambda_{ON}/\Lambda)[1+\{\sin(\pi\Delta\Lambda_{ON}/\Lambda)/(\pi\Delta\Lambda_{ON}/\Lambda)\}\sin(2\pi(z+\Delta\Lambda_{ON}/2)/\Lambda)]$$

where z is the position along the length of the grating; and
   $\Delta\Lambda_{ON}/\Lambda$ is the duty cycle of an intensity-modulated beam of UV radiation used to write the grating lines.

28. An optical waveguide grating according to claim 27, wherein the duty cycle is in the range of approximately 0.3 to 0.4.

29. An optical waveguide grating according to claim 27, in which the refractive index modulation in one or both end regions of the grating is further described in that it has a contrast which varies in accordance with a raised cosine envelope, the grating is apodised.

* * * * *

UNITED STATES PATENT AND TRADEMARK OFFICE
CERTIFICATE OF CORRECTION

PATENT NO. : 6,813,079 B2
DATED : November 2, 2004
INVENTOR(S) : Richard Ian Laming et al.

It is certified that error appears in the above-identified patent and that said Letters Patent is hereby corrected as shown below:

<u>Title page,</u>
Item [57], ABSTRACT,
Line 4, "writing pattern" should read -- writing light pattern --.

<u>Column 9,</u>
Line 17, "less that" should read -- less than --.

<u>Column 10,</u>
Line 65, "envelope, the grating" should read -- envelope, such that the grating --.

Signed and Sealed this

Twenty-fourth Day of May, 2005

JON W. DUDAS
*Director of the United States Patent and Trademark Office*